United States Patent [19]

Lange et al.

[11] Patent Number: 5,318,601
[45] Date of Patent: Jun. 7, 1994

[54] DYE MIXTURES CONTAINING AZO AND QUINOPHTHALONE DYES

[75] Inventors: Arno Lange, Bad Duerkheim; Gert Motzkus, Ludwigshafen; Helmut Degen, Frankenthal; Volker Walther, Weisenheim, all of Fed. Rep. of Germany

[73] Assignee: BASF Aktiengesellschaft, Ludwigshafen, Fed. Rep. of Germany

[21] Appl. No.: 38,845

[22] Filed: Mar. 29, 1993

[30] Foreign Application Priority Data

Apr. 1, 1992 [DE] Fed. Rep. of Germany ....... 4210763

[51] Int. Cl.⁵ .............................................. C09B 67/22
[52] U.S. Cl. ........................................... 8/639; 8/638; 8/644; 8/922
[58] Field of Search ................ 8/638, 639, 922, 644

[56] References Cited

U.S. PATENT DOCUMENTS

| | | | |
|---|---|---|---|
| 3,767,357 | 10/1973 | Spietschka et al. ................ | 8/638 |
| 4,427,413 | 1/1984 | Bäuerle .................................. | 8/639 |
| 4,548,613 | 10/1985 | Bode et al. ........................... | 8/638 |
| 4,772,292 | 9/1988 | Hähnke et al. ...................... | 8/638 |
| 4,941,887 | 7/1990 | Sakagawa et al. ................... | 8/638 |
| 5,038,415 | 8/1991 | Ueda et al. ........................... | 8/639 |

FOREIGN PATENT DOCUMENTS

| | | |
|---|---|---|
| 0083553 | 7/1983 | European Pat. Off. . |
| 0161665 | 1/1985 | European Pat. Off. . |
| 0491387 | 6/1992 | European Pat. Off. . |

*Primary Examiner*—Helene Klemanski
*Attorney, Agent, or Firm*—Oblon, Spivak, McClelland, Maier & Neustadt

[57] ABSTRACT

Dye mixtures containing from 50 to 95% by weight, of a 4-chloro-2-nitrophenylazohydroxypyridone dye and from 5 to 50% by weight of a chlorinated quinophthalone dye and/or from 5 to 20% by weight of an unsubstituted quinophthalone dye, dye formulations containing the novel dye mixtures and the use of dye mixtures for dyeing polyesters or printing them by the direct printing method.

5 Claims, No Drawings

DYE MIXTURES CONTAINING AZO AND QUINOPHTHALONE DYES

The present invention relates to novel dye mixtures containing from 50 to 95% by weight, based on the total weight of the dyes, of an azo dye of the formula I

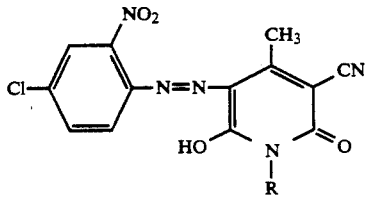

where R is $C_1$-$C_4$-alkyl, and from 5 to 50% by weight, based on the total weight of the dyes, of the quinophthalone dye of the formula IIa

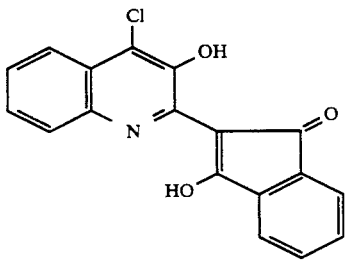

and/or from 5 to 20% by weight, based on the total weight of the dyes, of the quinophthalone dye of the formula IIb

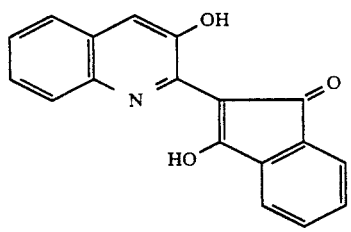

dye formulations containing the novel dye mixtures and the use of dye mixtures for dyeing polyesters in textile form or printing them by the direct printing method.

EP-A-83 553 describes dye mixtures which contain dyes of the formulae I (R=ethyl) and IIb, for transfer printing. In this application method, the dye is supplied by sublimation. Furthermore, EP-A-161 665 describes the use of dye mixtures containing the dyes of the formulae I (R=methyl), IIa (with bromine instead of chlorine) and IIb, for dyeing synthetic fibers.

However, these mixtures have unsatisfactory performance characteristics; in particular, their inadequate color strength and their poor fastness to dry heat setting and pleating may be mentioned in this context.

Finally, EP-A-491387 discloses a dye mixture for dyeing polyester, which contains the dyes of the formula I (R=ethyl) and IIa (with bromine instead of chlorine).

It is an object of the present invention to provide novel mixtures containing the dyes of the formulae I and II which no longer have the abovementioned disadvantages.

We have found that this object is achieved by the dye mixtures defined in detail at the outset.

R is, for example, methyl, ethyl, propyl, isopropyl, butyl, isobutyl or sec-butyl.

Preferred dye mixtures are those which contain an azo dye of the formula I where R is ethyl or butyl.

Other preferred dye mixtures are those which contain from 70 to 90% by weight, based on the total weight of the dyes, of an azo dye of the formula I and from 10 to 30% by weight, based on the total weight of the dyes, of the quinophthalone dye of the formula IIa and/or from 10 to 15% by weight, based on the total weight of the dyes, of the quinophthalone dye of the formula IIb.

The dyes of the formulae I and II and of the formula III below are in general known dyes. As stated above, they are described in, for example, EP-A-83 553 or the literature cited there.

The novel dye mixtures are prepared in a conventional manner, for example by mixing the particular components in the stated weight ratio. If necessary, further components, for example dispersants, such as lignin sulfonates or sulfonation products of the reaction product of formaldehyde with aromatics, thickeners or other assistants, may be added to the novel mixtures. It is also possible to mix prepared dye formulations of the particular components or prepared dye formulations with pure dyes.

Accordingly, the present invention furthermore relates to dye formulations containing from 15 to 60% by weight, based on the weight of the dye formulation, of a novel dye mixture defined in detail at the outset and from 40 to 85% by weight, based on the weight of the dye formulation, of a dispersant.

The present invention also relates to the use of dye mixtures containing from 50 to 95% by weight, based on the total weight of the dyes, of an azo dye of the formula I

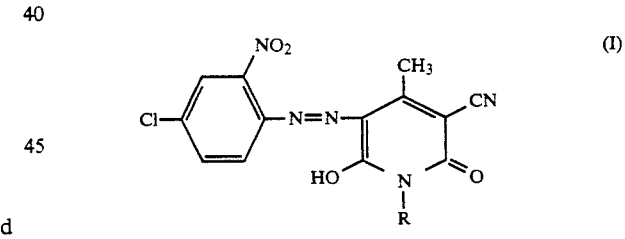

where R is $C_1$-$C_4$-alkyl, and from 5 to 50% by weight, based on the total weight of the dyes, of one or more quinophthalone dyes of the formula II

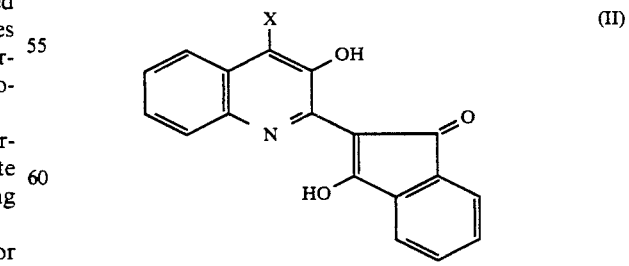

where X is hydrogen or chlorine, for dyeing polyesters in textile form.

The present invention furthermore relates to the use of dye mixtures containing from 50 to 95% by weight, based on the total weight of the dyes, of an azo dye of the formula I

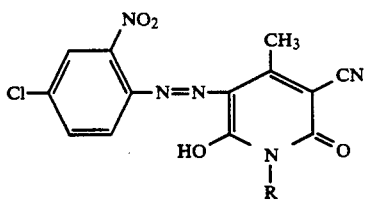

where R is $C_1-C_4$-alkyl, and from 5 to 50% by weight, based on the total weight of the dyes, of one or more quinophthalone dyes of the formula III

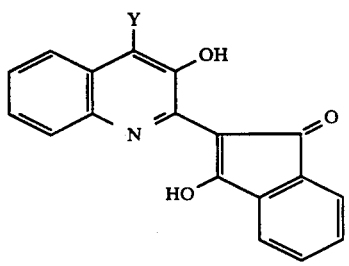

where Y is hydrogen, chlorine or bromine, for printing polyesters in textile form by the direct printing method.

Polyesters in textile form are, for example, fibers, woven fabrics or blended fabrics of polyesters with cotton, wool, cellulose acetate or triacetate. Dyeings or prints in a yellow shade are obtained. The dyeing and printing processes are known per se. In contrast to the transfer printing method, in which the dye is applied by sublimation from a carrier to the material to be printed, in the direct printing method the print paste containing the dye mixture is printed directly onto the material to be printed.

It is surprising that the novel dye mixtures have high color strength and fastness to dry heat setting and pleating.

The examples which follow illustrate the invention.

Dyeing method 10 g of woven polyester fabric are added at 50° C. to 200 ml of a dye liquor which contains 0.5% by weight, based on the polyester fabric, of a dye formulation and whose pH has been brought to 4.5 by means of acetic acid. Treatment is carried out for 5 minutes at 50° C., after which the temperature of the liquor is increased to 130° C. in the course of 30 minutes and the liquor is kept at this temperature for 60 minutes and then allowed to cool to 60° C. in the course of 20 minutes.

Thereafter, the dyed polyester fabric is reductively cleaned by being treated for 15 minutes at 65° C. in 200 ml of a liquor which contains 5 ml/l of 32% strength by weight sodium hydroxide solution, 3 g/l of sodium dithionite and 1 g/l of an adduct of 48 mol of ethylene oxide with 1 mol of castor oil. Finally, the fabric is washed, neutralized with dilute acetic acid, washed again and dried.

The abovementioned dye formulation contains in each case 40% by weight of dye mixture and 60% by weight of a dispersant based on lignin sulfonate, based in each case on the weight of the formulation.

The dye mixture has the composition stated in the table below, an azo dye of the formula I, where R is ethyl, being used.

| Example No. | Dye No. [% by weight, based on the dye mixture] | |
|---|---|---|
| | I | II |
| 1 | 90 | 10 |
| 2 | 80 | 20 |
| 3 | 70 | 30 |

Clear yellow dyeings having high color strength and good fastness to dry heat setting and pleating are obtained.

We claim:

1. A dye mixture containing a yellow dye component, wherein said yellow dye component consists essentially of from 50 to 95% by weight, based on the total weight of the dyes, of an azo dye of the formula I

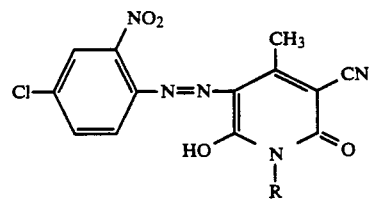

where R is $C_1-C_4$-alkyl, and from 5 to 50% by weight, based on the total weight of the dyes, of the quinophthalone dye of the formula IIa formula IIa

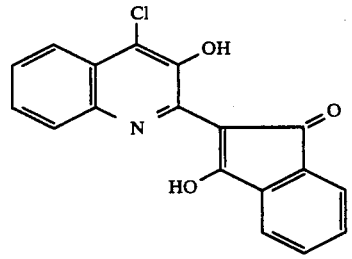

or from 5 to 20% by weight, based on the total weight of the dyes, of the quinophthalone dye of the formula IIb

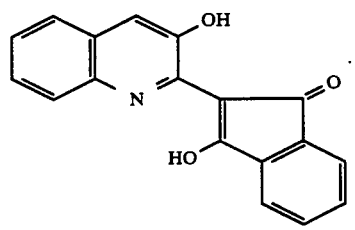

2. A dye mixture as claimed in claim 1, containing a yellow dye component, wherein said yellow dye component consists essentially of from 70 to 90% by weight, based on the total weight of the dyes, of an azo dye of the formula I and from 10 to 30% by weight, based on the total weight of the dyes, of the quinophthalone dye of the formula IIa or from 10 to 15% by weight, based on the total weight of the dyes, of the quinophthalone dye of the formula IIb.

3. A dye formulation containing from 15 to 60% by weight, based on the weight of the dye formulation, of a dye mixture as claimed in claim 1 and from 40 to 85% by weight, based on the weight of the dye formulation, of a dispersant.

4. A process for dyeing polyester textiles comprising directly contacting said textile with a dye mixture containing a yellow dye component, wherein said yellow dye component consists essentially of from 50 to 95% by weight, based on the total weight of the dyes, of an azo dye of the formula I

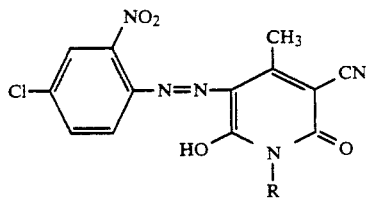

(I)

where R is $C_1$-$C_4$-alkyl, and from 5 to 50% by weight, based on the total weight of the dyes, of one or more quinophthalone dyes of the formula II

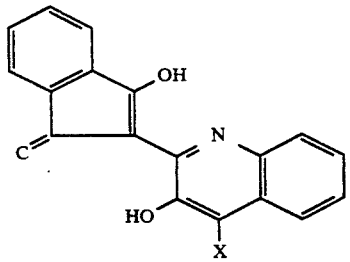

(II)

where X is hydrogen or chlorine.

5. A process for the printing of polyester textiles by the direct printing method, comprising directly contacting said textile with a print paste containing a yellow dye component wherein said yellow dye component consists essentially of from 50 to 95% by weight, based on the total weight of the dyes, of an azo dye of the formula I

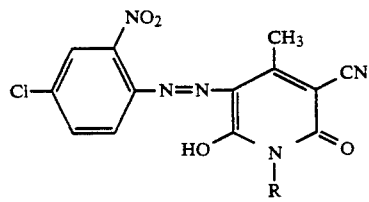

(I)

where R is $C_1$-$C_4$-alkyl, and from 5 to 50% by weight, based on the total weight of the dyes, of one or more quinophthalone dyes of the formula III

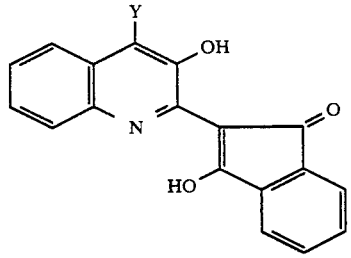

(III)

where Y is hydrogen, chlorine or bromine.

* * * * *